June 5, 1951  R. T. MARTIN  2,555,802
FISHING DEVICE
Original Filed Jan. 14, 1948

Robert T. Martin
INVENTOR.

BY *Clarence A. O'Brien
and Harvey B. Jacobson*
Attorneys

Patented June 5, 1951

2,555,802

UNITED STATES PATENT OFFICE 2,555,802

FISHING DEVICE

Robert T. Martin, Salem, Oreg.

Original application January 14, 1948, Serial No. 2,269. Divided and this application May 12, 1950, Serial No. 161,521

5 Claims. (Cl. 43—26.2)

This invention relates to new and useful improvements in fishing devices and is a divisional application of my co-pending application, Serial No. 2,269, filed January 14, 1948, and issued July 25, 1950, as Patent Number 2,516,133.

The primary object of the present invention is to provide a fishing device including a pair of slidably connected swingable legs and a propeller shaft for imparting swinging movement to the legs as the device is pulled through a fluid medium.

Another important object of the present invention is to provide a fishing device that simulates a frog and having forward and rear legs that will swing back and forth as the device is pulled through the water to attract fish thereto, and hooks mounted on the forward legs to impale fish striking at the device.

A further object of the present invention is to provide a fishing lure composed of two halves which are secured together and which halves house a resilient loop at one end of an oscillating member that will be moved in response to the rotation of a shaft carried by the lure.

A still further aim of the present invention is to provide a fishing device of the aforementioned character that is preferably constructed of plastic material and which is colored or painted to attract fish thereto.

Other objects and advantages reside in the details of construction and operation as more fully hereinafter described and claimed, reference being had to the accompanying drawings forming part hereof, wherein like numerals refer to like parts throughout, and in which:

Figure 1:
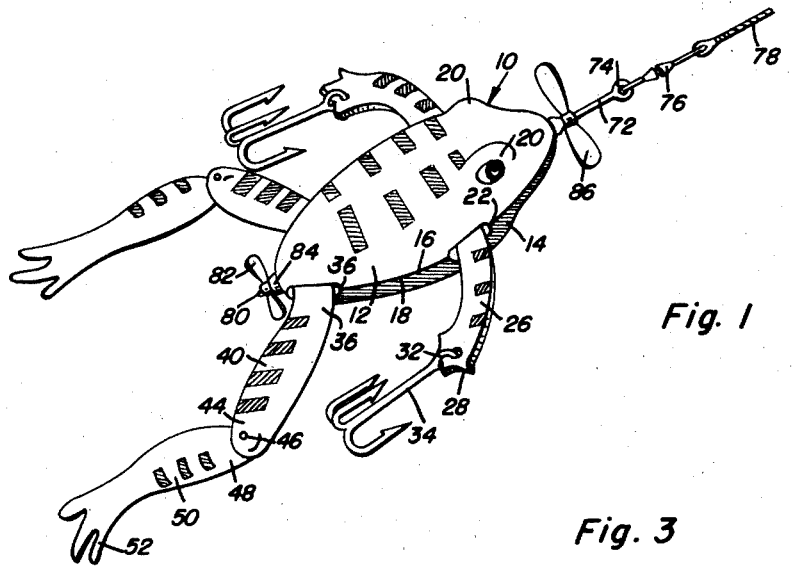
Figure 1 is a perspective view of the present invention.
Figure 3:
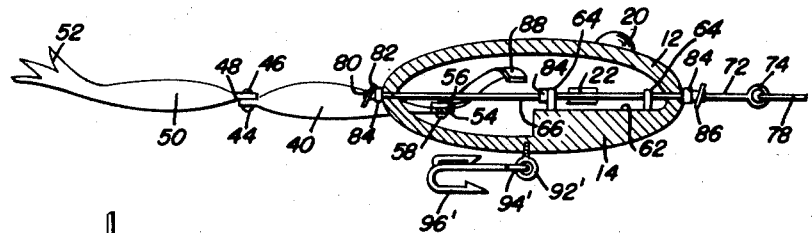
Figure 3 is a longitudinal sectional view through the center of Figure 1.
Figure 2:
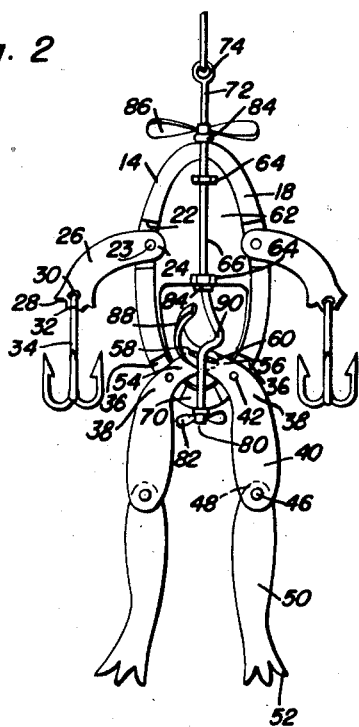
Figure 2 is a plan view of the present invention and with the upper half of the body removed.
Figure 4:
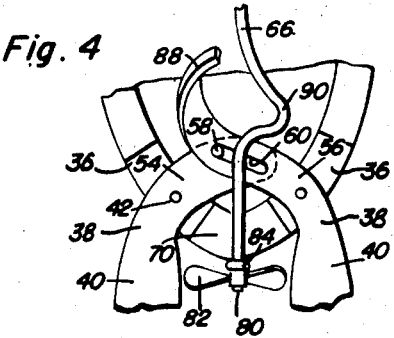
Figure 4 is an enlarged detail view showing the manner in which the inner sections of the rear legs are slidably connected together.

Referring now to the drawings in detail, wherein for the purpose of illustration, there is disclosed a preferred embodiment of the present invention, the numeral 10 represents an elongated hollow body portion comprising an upper portion 12 and a lower portion 14, having abutting edges 16 and 18 that are rigidly secured to each other by any suitable means such as cement or the like.

The body portion is shaped to simulate a frog and is, therefore, provided with protuberances 20 simulating eyes, and is preferably painted, to attract fish thereto.

Pivotally mounted in opposed notches 22 provided in the abutting edges 16 and 18 of the upper and lower portions 12 and 14, adjacent the forward ends thereof, by pins or the like 23, are the inner terminals 24 of arcuate substantially flat forward legs 26 having undulated outer extremities 28. Apertures 30 provided in the legs 26, adjacent the terminals 28, pivotally engage the eye portions 32 of a pair of side gangs of hooks 34.

Opposed notches 36 are also provided in the abutting edges 16 and 18 of the portions 12 and 14 adjacent the rear ends thereof, and these latest notches, 36, loosely receive the inner terminals 38 of a pair of inner rear leg sections 40 that are pivoted in said notches 36 by pins or the like 42. The outer terminals 44 of these leg sections 40 are pivoted by pins or the like 46 to the innermost terminals 48 of outer rear leg sections 50, preferably having undulated or toothed free extremities 52. The inner terminals 38 of the inner sections 40 are provided with arcuate, integral extensions 54 and 56, respectively, one of which supports an outwardly projecting guide lug or pin 58 that slidably engages a slot 60 provided in the other of said extensions.

Integrally formed with the inner periphery of the portion 14, adjacent the forward end thereof, is a bearing surface 62 that supports a pair of longitudinally spaced bearings or eye members 64 in which there is journaled a rotatable shaft 66 that loosely engages opposed recesses 68 and 70 provided in the abutting edges 16 and 18 of the portions 12 and 14, adjacent the forward and rear ends thereof.

The forward terminal 72 of the shaft projects outwardly from the body 10 and terminates in an eye 74 that is connected to a swivel 76 at one end of a flexible line 78. The rear terminal 80 of the shaft 66 projects outwardly from the rear end of the body 10 and is provided with a fixed rear propeller 82. Suitable bearings or washers 84 are carried by the outer terminals 72 and 80 of the shaft and by the shaft adjacent the eye members 64, to facilitate the shaft to rotate freely within the body. A forward propeller 86 is also fixed to the forward terminal 72 of the shaft 66 to assist in rotating the shaft when the body is pulled through a fluid medium.

A resilient spiral loop or cam 88 is integrally formed with one of the extensions of leg sections 40, preferably extension 56, and this loop embraces a substantially U-shaped lateral projection or crank portion 90 provided in the shank 66 adjacent surface 62.

It is preferred that an eye fastener 92' be secured to the outer periphery of the portion 14, at the longitudinal center thereof, and that the eye fastener engage the eye portion 94' of a lower gang of hooks 96'.

In practical use of the present invention, as the body portion is pulled through a fluid medium, the spinners or propellers 82 and 84 will rotate the shaft 66, effecting a rotation of the shaft 66. As the shaft 66 rotates, the lateral projection 90 will engage the resilient loop 88 during a one-half rotation of the shaft, pushing the loop 88 toward the inner periphery of the portion 14, causing pin 58 to slide in slot 60 in the extension 56 and thus causing the leg sections 40 to oscillate within the slots 36, and the sections 50 to likewise oscillate freely about pins 46.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and within the scope of the appended claims.

Having described the invention, what is claimed as new is:

1. A fishing device comprising a body portion, legs pivotally mounted on said body portion, means limiting the pivotal movement of said legs in both directions, and means for actuating said legs as the body portion is pulled through a fluid medium, said last-mentioned means including a drive shaft journaled in said body portion and provided with an offset, said legs having inner slidably connected end portions, the inner leg portion of one leg being provided with a loop, and the offset on said shaft engaging the loop during rotation of said shaft.

2. A fishing device comprising a body portion, a pair of forward legs pivoted on said body portion for forward and rear pivotal movement, a pair of rear legs pivoted on said body portion for forward and rear pivotal movement, said rear legs including inner slidably connected end portions, and means for actuating said rear legs as the body portion is pulled through a fluid medium, said means including a drive shaft having a crank-portion, and a cam carried by the inner end of one of said rear legs for engaging said crank-portion during rotation of said shaft.

3. A fishing device comprising a hollow body, a pair of forward legs pivoted on said body for forward and rear movement, a pair of rear legs pivoted on said body for forward and rear movement, said rear legs including inner and outer pivotal sections, means slidably connecting the inner sections of said rear legs together, and means for actuating said rear legs as the body is pulled through a fluid medium, said last-mentioned means including a drive shaft, propellers mounted on said shaft for imparting rotation to the shaft as the body is pulled through a fluid medium, a curved extension on the inner section of one rear leg, and a crank portion on said shaft for riding against said curved extension during rotation of said shaft.

4. The combination of claim 3 wherein said body includes an upper half and a lower half having abutting edges which are secured together, the abutting edges of said halves adjacent the rear end of said body having opposed notches in which the inner sections of said rear legs are pivotally mounted.

5. A fishing device comprising an elongated body having a pair of slots therein, a pair of legs pivoted to the walls of the slots for swinging movement, a longitudinally extending shaft journaled in said body, means mounted on said shaft and disposed exteriorly of said body for imparting rotation to the shaft as the body is pulled through a fluid medium, means slidably securing said legs together, and means carried by one of said legs and actuated during rotation of said shaft for moving the legs about their pivots.

ROBERT T. MARTIN.

REFERENCES CITED

The following references are of record in the file of this patent:

UNITED STATES PATENTS

| Number | Name | Date |
|---|---|---|
| 638,885 | Peterson et al. | Dec. 12, 1899 |
| 2,472,505 | Yocam et al. | June 7, 1949 |